United States Patent
Torres et al.

(10) Patent No.: US 8,187,360 B2
(45) Date of Patent: May 29, 2012

(54) PROCESS FOR THE INSTANTANEOUS CONTROL OF PRECIPITATION OF NICKEL AND COBALT PRESENT IN THE LEACH LIQUOR, BY ADJUSTING THE PH OF THE SOLUTION

(76) Inventors: Vanessa Macedo Torres, Minas Gerais (BR); Marcelo Augusto Castro Lopes da Costa, Minas Gerais (BR); Omar Antunes do Carmo, Minas Gerais (BR); Salomão Solino Evelin, Minas Gerais (BR)

( * ) Notice: Subject to any disclaimer, the term of this patent is extended or adjusted under 35 U.S.C. 154(b) by 0 days.

(21) Appl. No.: 12/306,880

(22) PCT Filed: Jun. 25, 2007

(86) PCT No.: PCT/BR2007/000166
§ 371 (c)(1),
(2), (4) Date: Dec. 29, 2008

(87) PCT Pub. No.: WO2008/003152
PCT Pub. Date: Jan. 10, 2008

(65) Prior Publication Data
US 2009/0241733 A1    Oct. 1, 2009

(30) Foreign Application Priority Data
Jul. 3, 2006   (BR) ..................... 0602787

(51) Int. Cl.
| C22B 23/06 | (2006.01) |
| C01F 7/34  | (2006.01) |
| C01G 49/02 | (2006.01) |
| C01G 53/04 | (2006.01) |
| C01G 37/00 | (2006.01) |
| C01G 51/04 | (2006.01) |
| C01G 45/02 | (2006.01) |

(52) U.S. Cl. .............. 75/743; 423/50; 423/55; 423/127; 423/140

(58) Field of Classification Search .................. 423/139, 423/140
See application file for complete search history.

(56) References Cited

U.S. PATENT DOCUMENTS

| 4,548,794 A | 10/1985 | Lowenhaupt et al. |
| 6,391,089 B1 | 5/2002 | Curlook |
| 7,387,767 B2 | 6/2008 | Campbell et al. |
| 2002/0031463 A1* | 3/2002 | White .......................... 423/138 |
| 2004/0228783 A1 | 11/2004 | Harris |

FOREIGN PATENT DOCUMENTS

| WO | WO 02/48042    | * | 6/2002 |
| WO | WO 02/48042 A1 |   | 6/2002 |

* cited by examiner

OTHER PUBLICATIONS

International Search Report in PCT/BR07/00166.

Primary Examiner — Jerry A Lorengo
Assistant Examiner — Jared Wood
(74) Attorney, Agent, or Firm — Lisa A. Chiarini; Hughes Hubbard & Reed LLP

(57) ABSTRACT

The present invention concerns a process for the instantaneous control of the precipitation of nickel and cobalt present in a leach liquor by adjustment of the pH-value. Said leach liquor is obtained by pressurized acidic leaching of laterite ores and additionally contains aluminium, ferric and ferrous iron and chromium among others. The process comprises the following steps: precipitation of aluminium, ferric and ferrous iron, chromium etc. by increasing the pH-value by adding a suitable reagent such as lime and/or limestone, following precipitation of nickel and cobalt by further increasing the pH-value of the liquor, finally separating the precipitate from the low-content nickel and cobalt solution. The nickel and cobalt precipitate can be used for further refinement. In order to keep the process conditions constant, the steps of increasing the pH-value are controlled simultaneously.

2 Claims, 4 Drawing Sheets

PROCESS FOR THE INSTANTANEOUS CONTROL OF PRECIPITATION OF NICKEL AND COBALT PRESENT IN THE LEACH LIQUOR, BY ADJUSTING THE PH OF THE SOLUTION

The present invention is directed to a process for the instantaneous control of precipitation of nickel and cobalt present in the leach liquor, by adjusting the pH of the solution, which process comprises the steps of adjusting the pH of a leach liquor containing nickel, cobalt and other elements dissolved in the acidic leaching process under pressure, since the balanced concentration in solution of the elements that should be precipitated (nickel and cobalt) varies as a function of the pH, so that said adjustment takes place after the leach liquor solution is subjected to at least a previous step of selective precipitation of aluminum, ferric iron, ferrous iron, chromium, among others, by adjusting the pH through the use of a suitable reagent such as lime and/or limestone; by carrying out a second adjustment of the pH an instantaneous precipitation control of nickel and cobalt is accomplished, and as a consequence the nickel and cobalt will precipitate from said leach liquor; such precipitated material separated from the low nickel and cobalt solution will be used in refineries for the recovery of such elements later on.

This is a national stage application filed under 35 U.S.C. §371 of PCT application Ser. No. PCT/BR07/00166, filed Jun. 25, 2007. Priority is claimed on patent application No. PI 0602787-3 filed in Brazil on Jul. 3, 2006.

DISCLOSURE OF THE INVENTION

The present specification is directed to a process for the instantaneous control of precipitation of nickel and cobalt and impurities, such as aluminum, iron, chromium, among others, present in the leach liquor, resulting from the acidic leaching under the pressure of laterite ores, by adjusting the pH of the solution, more specifically, said process controls the simultaneous precipitation of nickel and cobalt and impurities present in the leach liquor instantaneously, mainly the manganese whenever it is present, in such a way that a suitable product is provided and is refined later on.

As is known by those skilled in this art, the laterite ores can be treated by using either hydrometallurgy or pyrometallurgy, but such processes usually result in a too high-energy consumption, as is the case of the melting processes for producing FeNi and ammoniacal leaching, thus making the use of low nickel laterite ores uneconomical. The sulfuric leaching at high pressures provides lower energy consumption.

Presently, the ammoniacal leaching processes and sulfuric leaching processes carried out under pressure have been the two main hydrometallurgy technologies used to recover nickel and cobalt from ferruginous laterites.

Although the sulfuric leaching process carried out under pressure does not provide significant profits in terms of capital cost with respect to the most conventional technologies, it makes it possible to obtain nickel with great economic advantages in terms of operational cost. The process also makes it possible to recover high levels of cobalt.

The nickel and cobalt present in laterite ores are normally recovered therefrom by using acidic leaching under pressure, wherein an acid that is added to a pressure vessel dissolves the minerals present in the ores, and thus the elements present in the minerals are solubilized in the aqueous mean. An exception is the iron that is usually present in laterite ores in significant amounts. When such a process is used to recover nickel and cobalt present in the ore under the temperature and pressure conditions that the process is carried out, there will be a dissolution selectivity in relation to the iron that, if that is not the case, would probably increase the acid consumption in this process to impractical values.

The fact is that a typical laterite nickel ore contains, besides nickel, cobalt and iron, other elements that will be solubilized in the aqueous mean together with the two first ones. Magnesium, aluminum, manganese and chromium, when present as well as in addition to others, will make out the leach liquor along with nickel and cobalt.

Mostly, the conventional processing of this leach liquor is comprised of one or more steps of precipitating the impurities present in the leach liquor (elements other than nickel and cobalt) in a selective way by adjusting the pH of said leach liquor through the use of reagents such as lime, limestone or magnesia. In this case, the separation of the metals present in the leach liquor is accomplished by taking advantage of the fact that the hydroxides of such metals will precipitate at different pH intervals.

U.S. Pat. No. 3,466,144 discloses a method for recovering nickel and cobalt in solutions by adjusting the pH above 7 by adding magnesia to such solutions.

However, along the specification of said patent, there is no mention to the way said precipitation is controlled, so that the leached product can contain impurities that co-precipitate together with nickel and cobalt and contaminate high levels of the precipitated material.

U.S. Pat. No. 6,409,979 discloses a method for the addition of the reagent used to selectively precipitate nickel and cobalt in solutions derived from the acidic leaching under pressure from nickel-containing laterites.

In the above-mentioned patent there is a time interval required for the analysis of the solution in such a way that the dosage can be accomplished on a stoichiometric basis. During said time, the chemical composition of the solution can be changed and the stoichiometric dosage will be based on an analysis that will not match the one that feeds the process.

The patent application in question, distinct from those already mentioned, proposes a method for the instantaneous precipitation selectivity control of nickel and cobalt on the impurities.

A further object of the present invention is to provide a method for the instantaneous control of nickel and cobalt that makes it possible to obtain of a more purified nickel and cobalt hydroxide to be refined later on.

These and other objects and advantages of the present invention are attained through a method for the instantaneous control of nickel and cobalt that consists of one or more tanks where the precipitation is carried out. Usually, calcined magnesia is added to the first tank, if more than one tank are employed. The precipitated material is separated from the solution having a low content of the elements usually precipitated in a thickener and said solid product is filtered later on before being refined. The filtered product can also be sold as a final product.

The present invention is directed to a process for controlling the precipitation of nickel and cobalt hydroxides present in a leach liquor resulting from the acidic leaching carried out under pressure of laterite nickel ores and that has already subjected to at least a step of precipitating the impurities contained in said leach liquor. The resulting product can also contain other elements, such as iron, magnesium and manganese, and is suitable for the selective leaching using ammonia or ammonia-ammonium carbonate to produce a more purified nickel and cobalt solution.

The present invention will be described below with reference to the accompanying drawings, wherein.

Figure 1:
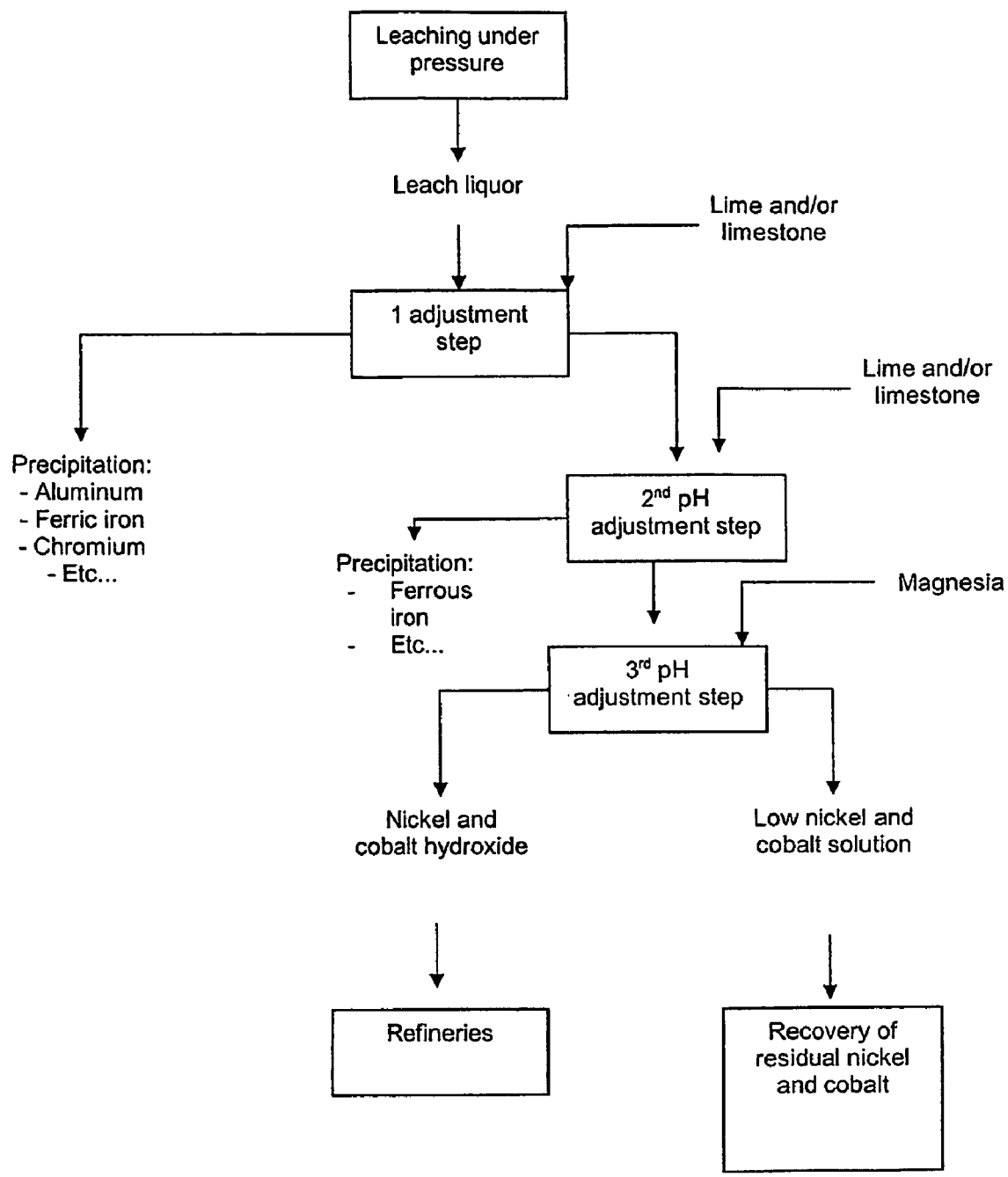
FIG. 1 represents the flowchart of the process for the instantaneous control of the precipitation of nickel and cobalt present in the leach liquor, by adjusting the pH of the solution.

According to the flowchart shown, the process consists basically of adjusting pH of a leach liquor containing nickel, cobalt and other elements dissolved in the acidic leaching process under pressure, since the balanced concentration in solution of the elements that should be precipitated (nickel and cobalt) varies as a function of the pH. This adjustment takes place after the leach liquor solution is subjected to a previous step of selective precipitation for precipitating aluminum, ferric iron, ferrous iron, chromium, among others, by adjusting the pH using a suitable reagent such as lime and/or limestone. Thus, through the adjustment of pH an instantaneous control of the precipitation of nickel and cobalt is attained by adjusting the pH, and as a consequence the nickel and cobalt will precipitate from said leach liquor, and it is said precipitated material which is separated from the low nickel and cobalt solution that will be used in refineries for recovering such elements later on.

In a detailed way, the precipitation of nickel and cobalt from the solution is accomplished by adding solid calcined magnesia or magnesia as a pulp to the solution. The precipitation time shall not be lower than one hour and the temperature should be between 40 and 70° C., preferably 50° C. The addition is made in such a way that the pH of the solution is between 7.0 and 8.0, more preferably between 7.4 and 7.5, in order to have a nickel precipitation of about 85%. Under such conditions, between 97 and 98% cobalt precipitates. If the manganese is present in solution, its precipitation under such conditions will be of approximately 35%. The precipitated product is separated from the solution in any equipment designed for this purpose, such as a thickener, and filtered later on in a washing step in order to reduce or even eliminate the impregnated magnesium sulfate present therein. After being washed, the filtered product is used in refineries designed for the recovery of the nickel and cobalt present therein.

During the precipitation step, the operation pH is controlled simultaneously. If the process comprises more than one step, the pH is controlled in any one of them, preferably between the next to the last and the last one, more preferably in the last one. The operation pH corresponds to pH of the solution in the step where it is analyzed and this can be done with any equipment designed to measure the pH measurement such as, for example, a pH meter.

EXAMPLE

After an acidic leaching under pressure in an autoclave of a Brazilian laterite nickel ore, the pH of the resulting leach liquor was adjusted to 3.0, in a first step, by using limestone. In a second step, the pH of the solution was adjusted to 4.9, also by using limestone. In a third step, calcined magnesia as a pulp (20% solids) comprising magnesia and water was added to this solution for the purpose of precipitating nickel and cobalt in solution for different pH values. The composition of the solution that fed the nickel and cobalt precipitation process varied as shown in the table below (mg/L):

| Ni | Co | Mn | pH |
|---|---|---|---|
| 2534 | 134 | 660 | 5.14 |
| 2889 | 144 | 652 | 4.68 |
| 3383 | 160 | 688 | 4.68 |
| 3823 | 175 | 732 | 4.52 |
| 3349 | 157 | 660 | 5.11 |
| 3249 | 153 | 649 | 4.84 |
| 3006 | 142 | 675 | 5.04 |
| 3039 | 155 | 759 | 5.01 |
| 3096 | 144 | 652 | 4.80 |
| 311 | 139 | 598 | 4.76 |
| 2978 | 138 | 609 | 4.91 |
| 366 | 164 | 666 | 4.87 |
| 3501 | 151 | 639 | 4.81 |
| 3437 | 146 | 624 | 4.77 |
| 3270 | 147 | 620 | 4.83 |
| 3561 | 163 | 696 | 4.88 |
| 3387 | 151 | 631 | 4.70 |
| 3843 | 173 | 739 | 4.68 |
| 3265 | 150 | 664 | 4.58 |
| 3613 | 157 | 722 | 4.69 |
| 3258 | 159 | 682 | 4.64 |
| 3439 | 157 | 664 | 4.82 |
| 3635 | 162 | 686 | 4.57 |
| 3171 | 140 | 593 | 4.57 |
| 3380 | 150 | 649 | 4.71 |
| 3702 | 164 | 717 | 4.41 |
| 3599 | 167 | 742 | 4.55 |
| 4147 | 192 | 728 | 4.72 |
| 7984 | 365 | 633 | 4.56 |
| 2918 | 128 | 640 | 4.75 |
| 3261 | 142 | 628 | 5.16 |
| 3359 | 146 | 637 | 4.44 |
| 3631 | 163 | 751 | 4.49 |
| 4041 | 190 | 1018 | 4.56 |
| 3759 | 180 | 990 | 4.55 |
| 3989 | 189 | 1004 | 4.48 |
| 4168 | 192 | 1036 | 4.59 |
| 4180 | 191 | 1041 | 4.47 |
| 4124 | 188 | 1004 | 4.71 |
| 4212 | 195 | 1044 | 4.52 |
| 3900 | 189 | 1108 | 4.78 |
| 3875 | 188 | 1085 | 4.70 |
| 3988 | 198 | 1114 | 4.76 |
| 3503 | 176 | 985 | 4.65 |
| 3624 | 184 | 1037 | 4.79 |
| 3738 | 186 | 980 | 4.87 |
| 3631 | 177 | 872 | 4.61 |
| 3679 | 175 | 847 | 4.52 |
| 3892 | 184 | 858 | 4.46 |
| 3802 | 178 | 815 | 4.64 |
| 3860 | 177 | 822 | 4.85 |
| 3956 | 179 | 828 | 4.61 |
| 3955 | 178 | 833 | 4.41 |
| 4020 | 183 | 851 | 4.62 |
| 4128 | 187 | 865 | 4.92 |
| 3966 | 180 | 822 | 4.68 |
| 3690 | 178 | 865 | 4.78 |
| 3029 | 133 | 629 | 4.56 |
| 3384 | 150 | 665 | 4.37 |
| 3549 | 158 | 741 | 4.83 |
| 3893 | 168 | 777 | 4.54 |
| 3789 | 168 | 772 | 4.71 |
| 3901 | 175 | 813 | 4.50 |
| 3774 | 161 | 756 | 4.38 |
| 4012 | 175 | 852 | 4.62 |
| 3261 | 146 | 710 | 4.60 |
| 3578 | 156 | 778 | 4.58 |
| 3532 | 161 | 794 | 4.68 |
| 3233 | 152 | 744 | 4.69 |
| 3347 | 157 | 749 | 4.59 |
| 3421 | 154 | 743 | 4.65 |
| 3456 | 154 | 745 | 4.81 |
| 3789 | 167 | 812 | 4.96 |

Figure 2:
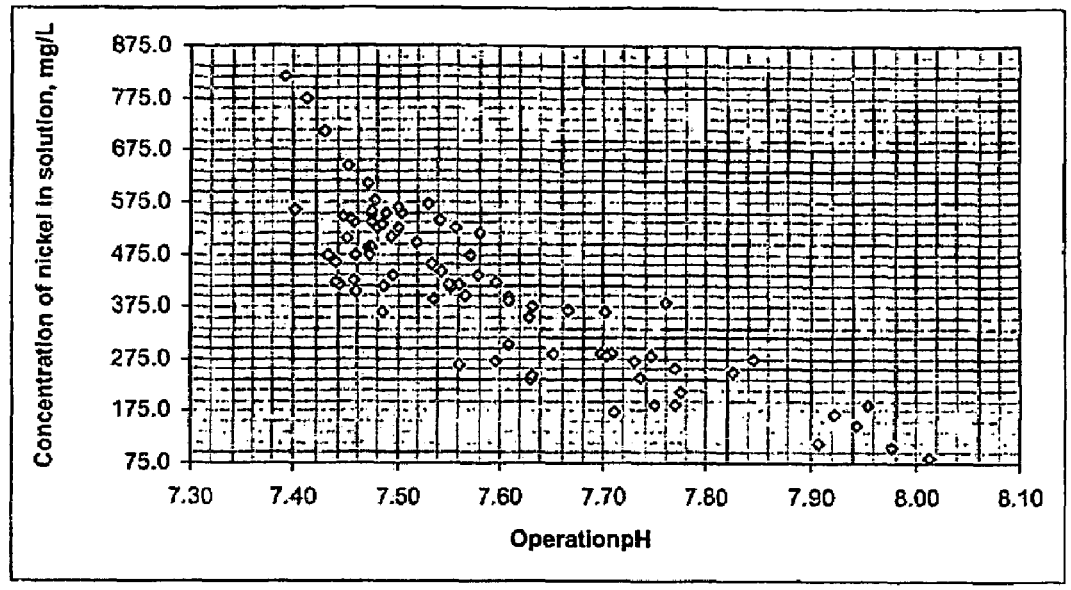
FIG. 2 is a graph that represents the nickel concentration in solution versus the operation pH.
Figure 3:
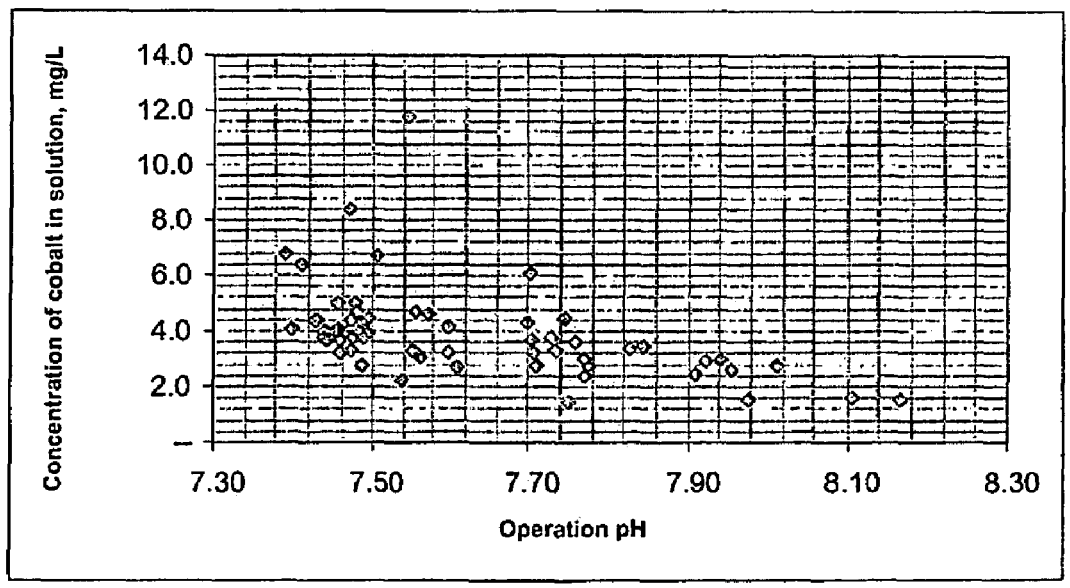
FIG. 3 is a graph that represents the concentration of cobalt in solution versus the operation pH.
Figure 4:
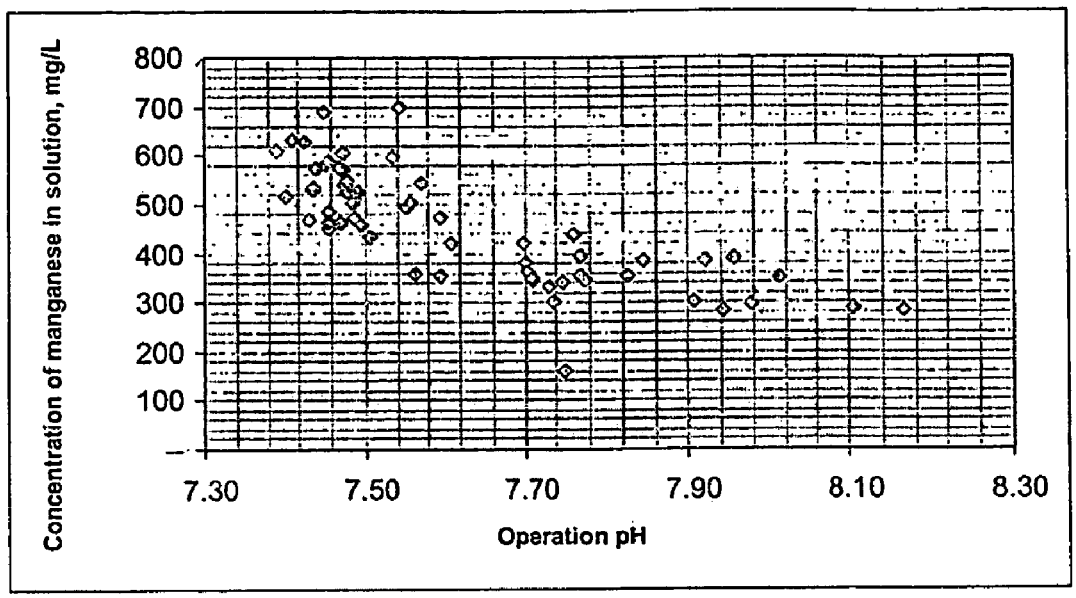
FIG. 4 is a graph that represents the manganese concentration in solution versus the operation pH.

The precipitation time was approximately three hours and the change in the concentration of the nickel, cobalt and manganese solution as a function of the solution pH is given in FIGS. 2, 3 and 4, respectively.

Figure 5:
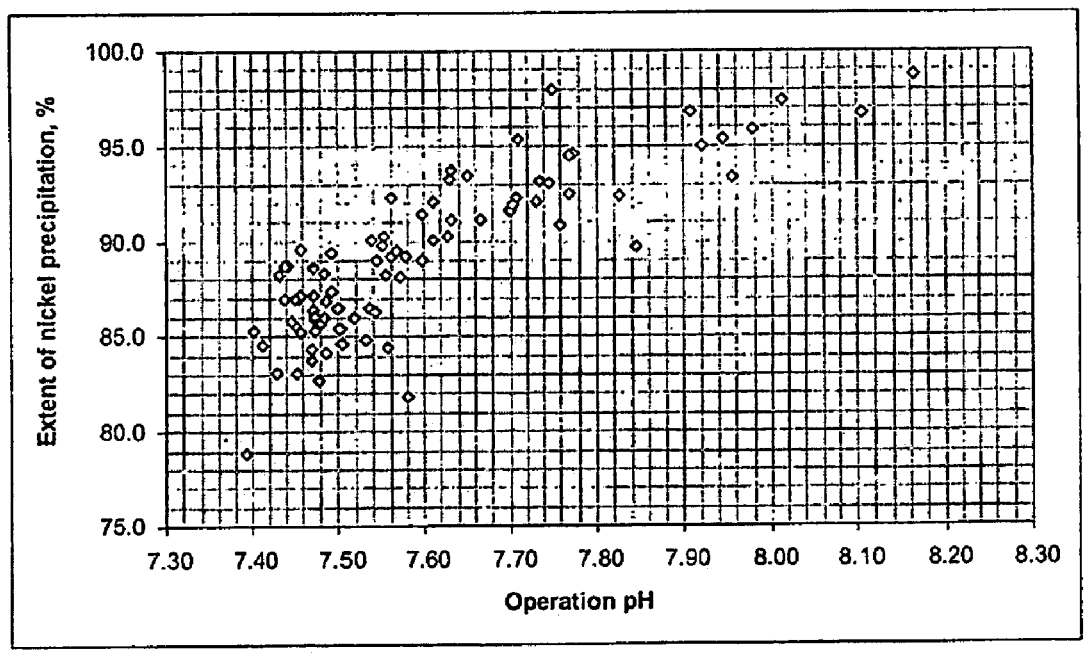
FIG. 5 is a graph that represents the extent of the precipitation of nickel in solution versus the operation pH.
Figure 6:
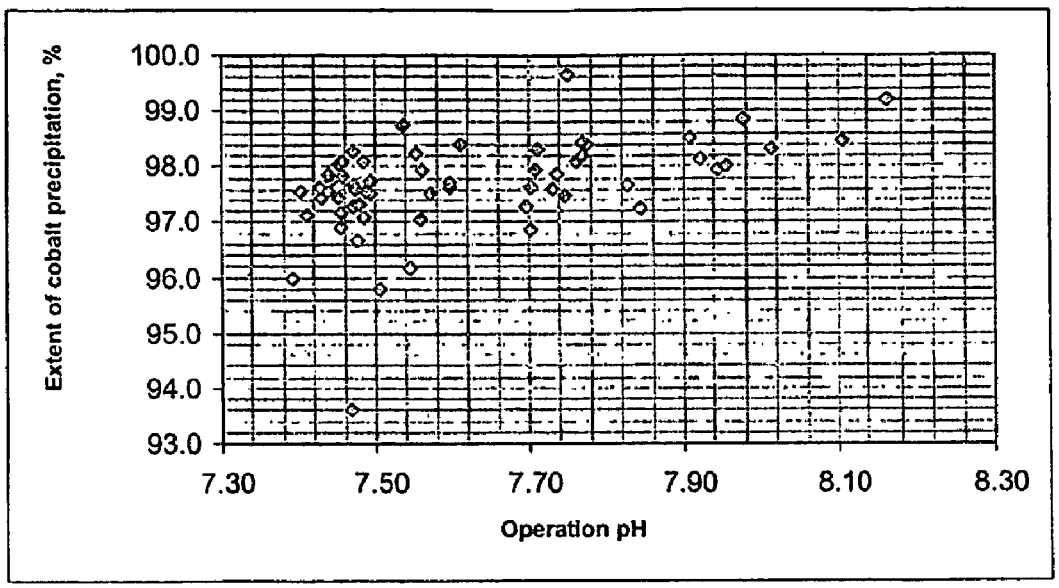
FIG. 6 is a graph that represents the extent of the precipitation of cobalt in solution versus the operation pH.
Figure 7:
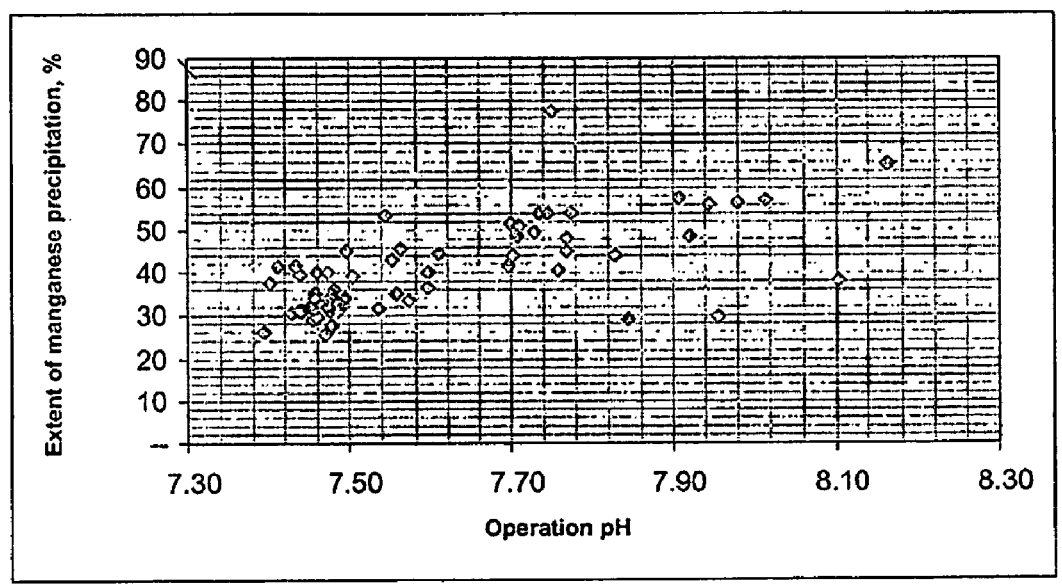
FIG. 7 is a graph that represents the extent of the manganese precipitation in solution versus the operation pH.

The variation of the extent of nickel, cobalt and manganese precipitation as a function of the solution pH is illustrated in FIGS. 5, 6 and 7, respectively. The extent was calculated based on the masses of said elements that fed the process and the masses of said elements in the solution having a low content of said elements, leaving this precipitation step.

The control of the solution pH was accomplished by using the pH meter installed in the last tank of the nickel and cobalt precipitation process.

Although a preferred operational process has been described and illustrated, it should be recalled that changes to said process are possible and attainable without departing from the scope of the present invention.

The invention claimed is:

1. A process for the instantaneous control of the precipitation of Ni and Co present in a leach liquor resulting from the pressure acid leaching of laterite ores using pH adjustments to the solution, comprising:
   a. precipitating Al, ferric Fe, and Cr while minimizing the precipitation of Ni, Co, and Mn by making additions of lime and/or limestone to the solution while controlling the pH in the solution within a first pre-determined range;
   b. precipitating ferrous Fe while minimizing the precipitation of Ni, Co, and Mn by making additions of lime and/or limestone to the solution while controlling the pH in the solution within a second pre-determined range;
   c. separating the precipitated Al, ferric and ferrous Fe, and Cr from the solution; and
   d. precipitating Ni and Co by making additions of magnesia to the solution while controlling the pH of the solution within a third predetermined range, wherein the procedure for precipitating Ni and Co from the solution comprises the steps of:
      i. adding solid calcined magnesia to the solution while measuring the pH of the solution;
      ii. adding the magnesia in a controlled manner such that the pH of the solution is maintained between 7.0 and 8.0;
      iii. carrying out the precipitation over a period of time covering approximately three hours at a temperature of approximately 50° C.;
      iv. separating the precipitated product from the solution using equipment designed for that purpose;
      v. washing the precipitated material, thereby reducing or even eliminating the impregnated magnesium sulfate present therein; and
      vi. treating the filtered and washed product at refineries designed for the recovery of the contained Ni and Co.

2. A process for the instantaneous control of the precipitation of Ni and Co present in a leach liquor resulting from the pressure acid leaching of laterite ores using pH adjustments to the solution according to claim 1, in that the pH adjustments are carried out in one or more steps.

* * * * *